J. BIENZ.
PROCESS OF CARBONATING LIQUIDS.
APPLICATION FILED NOV. 17, 1904.
943,060.
Patented Dec. 14, 1909.
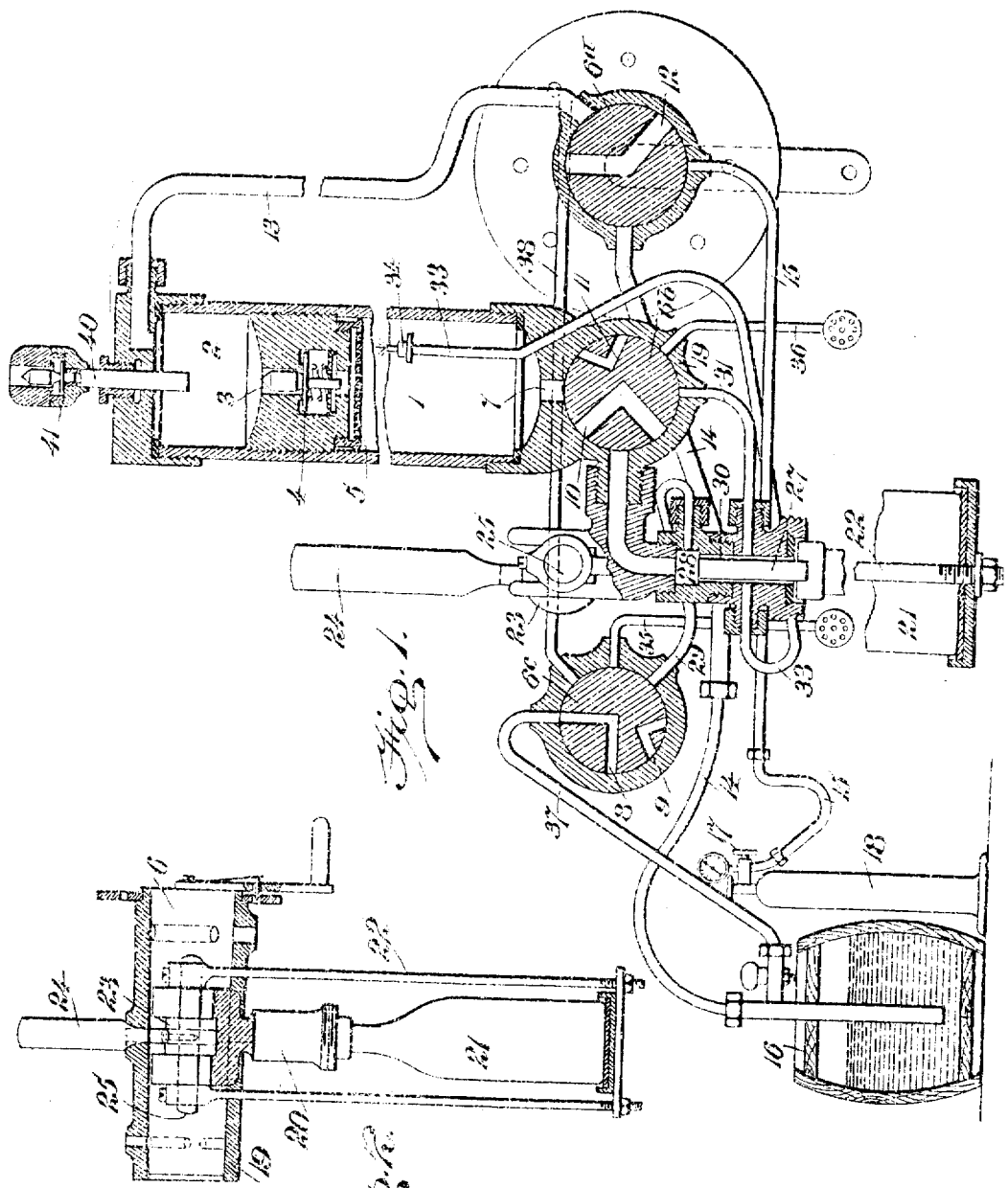
WITNESSES:
INVENTOR
Jean Bienz
BY
Knight Bros
Attorneys J. BIENZ.
PROCESS OF CARBONATING LIQUIDS.
APPLICATION FILED NOV. 17, 1904.
943,060.
Patented Dec. 14, 1909.
2 SHEETS—SHEET 2.
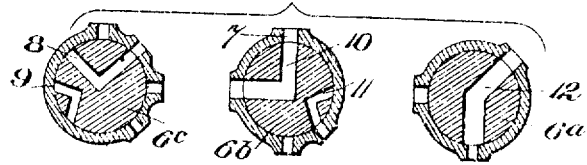
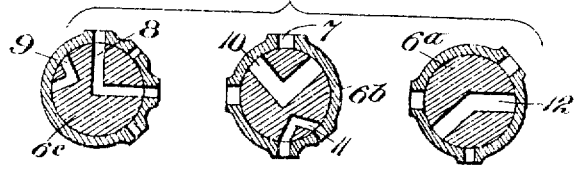
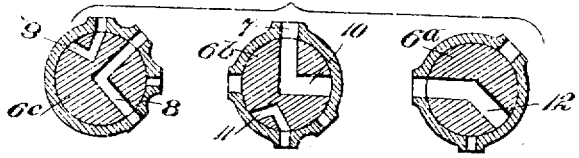
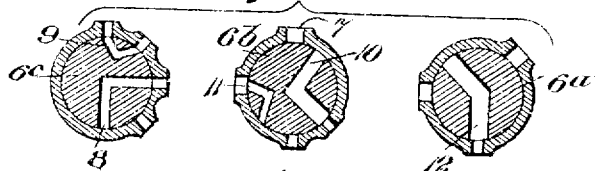
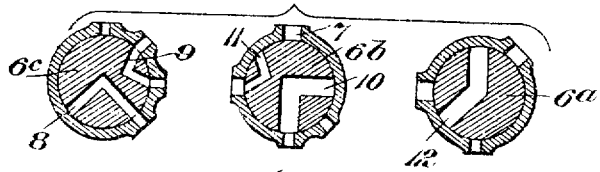
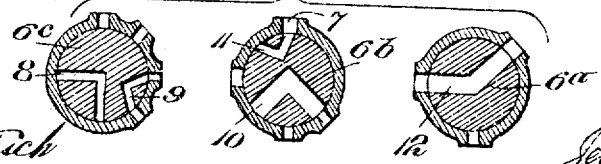

UNITED STATES PATENT OFFICE.

JEAN BIENZ, OF LANGENTHAL, SWITZERLAND.

PROCESS OF CARBONATING LIQUIDS.

943,060.  Specification of Letters Patent.  Patented Dec. 14, 1909.

Application filed November 17, 1904. Serial No. 233,145.

*To all whom it may concern:*

Be it known that I, JEAN BIENZ, a citizen of Switzerland, residing at Langenthal, in the Canton of Berne, Switzerland, have invented certain new and useful Improvements in Processes of Carbonating Liquids, of which the following is a specification.

The present invention relates to a process of carbonating liquids.

According to the present invention the liquid to be carbonized is forced in finely divided condition through a mixing chamber containing carbonic acid free of atmospheric air, and the liquid having been highly saturated in the mixing chamber, is conducted directly to a bottle or other storing vessel, which has been previously entirely filled with carbonic acid at the same pressure as that of the carbonic acid in the mixing chamber. The air which was in the storing vessel prior to the introduction of the carbonic acid is forced out by the carbonic acid, and the carbonic acid, which is forced out from the storing vessel when the carbonated liquid enters the said vessel, is conducted back to the mixing chamber.

In the accompanying drawing, in which I have shown an apparatus for carrying out my improved carbonating process, Figure 1 is a diagrammatic view of the apparatus in vertical section, the three plug valves being closed and parts of the apparatus being broken away. The receptacles 16 and 18 are shown on a reduced scale. Fig. 2 is a side view, partly in section on a reduced scale of the lower part of the apparatus showing the means for pressing a bottle against the apparatus. Figs. 3, 4, 5, 6, 7, and 8 are sections through the three plug valves showing the positions which the plug valves occupy when they are turned through angles of 45°, 90°, 135°, 180°, 225°, and 270°, respectively, from the position shown in Fig. 1.

1 is a mixing chamber and 2 is a pressure chamber surmounting the mixing chamber and communicating therewith by means of a channel 3. A check-valve 4 in the channel 3 prevents the passage of liquid or gas from the mixing chamber 1 to the pressure chamber 3 and at the lower terminus of the channel 3 is located a sieve 5.

Below the mixing chamber 1 are arranged three multiple-way plug valves 6ª, 6ᵇ and 6ᶜ adapted to be turned in unison. The plug valve 6ª has one passage-way 12, the plug valve 6ᵇ has two passage ways 10 and 11 and the plug-valve 6ᶜ has two passage-ways 8 and 9. The mixing chamber 1 is provided with an outlet 7 adapted to register with the passage-way 10. In the housing of the plug-valve 6ª are inserted three pipes 13, 14 and 15 adapted to register with the passage-way 12. The pipe 13 opens into the upper part of the pressure chamber 2, while the pipe 15 projects into a reservoir 18 containing compressed carbonic acid.

To the main-housing 19 is rigidly secured a filling cup 20. A supporting frame 22 is secured to the shaft 25 carrying a cam disk 23 and a handle 24, the cam-disk 23 will cause the shaft 25 and the supporting frame 22 to be reciprocated and a bottle 21 placed on the supporting frame may be pressed into the filling cup 20. The bottom of the supporting frame is made adjustable so as to make it possible to employ bottles of different sizes.

27 is a pipe leading from the cup 20 to the plug-valve 6ᵇ and provided with an enlargement 28 into which opens a pipe 29 leading to the plug valve 6ᶜ. Below the enlargement 28, the cup 20 is provided with a chamber surrounding the pipe 27 and communicating with the interior of the bottle when the bottle is placed on the cup. A pipe 31 leads from the chamber 30 to the plug-valve 6ᵇ and a pipe 33 leads from the chamber 30 to the interior of the mixing chamber 1. A check-valve 34 on pipe 33 prevents liquid or gas from passing from chamber 1 to chamber 30. Pipes 35 and 36 extend from the plug-valves 6ᵇ and 6ᶜ and terminate in perforated hollow balls in the interior of which are placed sponges for muffling the sound of the exhaust of compressed aid or carbonic acid when taking place through the pipes 35 and 36. A pipe 37 leads from the plug-valve 6ᶜ to the reservoir 16 and a pipe 38 leads from the plug-valve 6ᶜ to the pipe 13.

I will now describe my process as carried out by the apparatus above-described.

Let it be assumed that the parts occupy the positions shown in Fig. 1, that is to say, all three plug-valves are closed. Let it further be assumed that the pressure chamber 2 contains liquid to be carbonated and the mixing chamber contains compressed carbonic acid, the pressure of which is determined by adjustment of the reduction valve 17, while a bottle 21 to be filled, is pressed against the charging head. When the plug-valves are turned 45°, the plugs will occupy the positions shown in Fig. 3 and a pressure equalization will take place between the mixing chamber 1 and the interior of the bottle 21, so that carbonic acid passes into the bottle 21 from the mixing chamber 2. This reduces the pressure in the mixing chamber 1, and the contents of chamber 2, which is brought into communication with the gas container 18, by the position of the valve shown in Fig. 3, is forced out of chamber 2 by pressure from the container 18, and into the mixing chamber 1, that is already filled with carbonic acid. When the liquid enters the mixture chamber 1, it will be finely divided by the sieve 5 and while the liquid passes through the mixing chamber, it will be highly saturated with carbonic acid. The liquid leaves the mixing chamber through the outlet 7, and flows through passage-way 10 and pipe 27 to the bottle 21, forcing the carbonic acid, which is in the bottle, out through the pipe 33, into the mixing chamber 1.

When the bottle has been filled with the saturated liquid, the plug-valves are turned 45° so as to occupy the positions shown in Fig. 4, in which the interior of the bottle communicates with the atmosphere through the chamber 30, the pipe 31, the passage-way 11 and the pipe 36, while the reservoir 16 communicates with the atmosphere through the pipe 37, the passage-way 8 and the pipe 35, and the pressure in the bottle and in the reservoir 16 is consequently reduced to atmospheric pressure. The filled bottle may then be detached from the filling cup and closed and another empty bottle may be attached. Upon further turning the plug-valves 45° to the position shown in Fig. 5, carbonic acid will pass from the pressure chamber 2 through the pipes 13 and 38, the passage-way 8 and the pipes 29 and 27 into the bottle until pressure equalization has taken place. As the carbonic acid is of greater specific gravity than the atmospheric air, it will occupy the lower part of the bottle and force the atmospheric air to the upper part of the bottle.

When the plug-valves are turned 45° to the positions shown in Fig. 6, communication is established between the pressure-chamber 2 and the liquid reservoir 16 and as carbonic acid flows from the pressure-chamber into the liquid reservoir, the pressure in the pressure-chamber will be further reduced. The plug-valves are thereupon turned 45° to the positions shown in Fig. 7, the pressure-chamber 2 will communicate with the atmosphere through the pipes 13 and 38, the passageway 9 and the pipe 35 and the pressure in the chamber 2 will consequently be reduced to atmospheric pressure. When the plug-valves are turned further 45° to the positions shown in Fig. 8, communication will be established between the interior of the bottle and the atmosphere through the passage-way 9, and the compressed carbonic acid in the bottle will expand and force out of the bottle the atmospheric air that might remain in the upper part thereof. The turning of the plug-valves to the positions shown in Fig. 8, has, however, effected communication of the liquid reservoir 16 with the pressure chamber 2 through the passage-way 12, and the carbonic acid, which has passed into the reservoir 16, when the valves were in the positions shown in Fig. 6, now expands and causes the liquid to flow from the reservoir 16 to the chamber 2, while the carbonic acid contained in the chamber 2, will escape through the pipe 40 and the relief-valve 41, the valve being constructed in such a manner that it opens at a slight pressure while it automatically closes when the pressure is greater. The valve will therefore be closed when the carbonic acid, which has great pressure, flows from the container 16 to the pressure chamber 2 when the valves are in the positions shown in Fig. 3. The flow of liquid into the chamber 2 continues until the liquid is on level with the lower opening of the tube 40. By suitable adjustment of the pipe 40 and its bottom opening, the amount of liquid which the chamber 2 contains after each filling, is regulated so as to correspond to the volume of the bottle to be filled, and the mixing chamber 1, therefore, does not contain any liquid when the plug-valves pass from the positions shown in Fig. 1 to those shown in Fig. 3. When the pressure-chamber 2 has been filled and the plug-valves are turned 90° to the closed position shown in Fig. 1, the pressure chamber 2 contains liquid to be saturated, the mixture chamber 1 contains compressed carbonic acid and the bottle 21 contains carbonic acid at atmospheric pressure or in other words the conditions are similar to those at the start of the operations.

From what has been said in the foregoing remarks, it will be understood, that the saturation of the liquid with carbonic acid takes place in the absence of atmospheric air. Furthermore, the filling of the liquid into the bottle takes place with exclusion of the atmospheric air, as the counterpressure in the bottle to be filled is formed by carbonic acid, and the result thereof is, that when the bottle has been filled and the pressure is relieved (Fig. 4), only a slight amount of carbonic acid will escape from the contents of the bottle, and the removal and closing of the bottle may therefore be effected easily and without any special manipulations.

In the instance where the liquid reservoir is located at a high elevation or where the liquid to be filled into the pressure-chamber is taken from a pressure-pipe (for instance, from a town-aqueduct), the plug-valves may be turned directly from the positions shown in Fig. 6 to those shown in Fig. 8, and in such case carbonic acid passes from the pressure-chamber and out into the atmosphere, when the plug-valves are in the positions shown in Fig. 8.

Having thus described my invention, what I claim is:

1. The herein-described process of carbonating and bottling liquids, which consists in filling a pressure chamber with liquid from a storage tank and filling a mixing chamber with carbonic acid under pressure, filling a storing vessel with carbonic acid from the mixing chamber whereby the pressure in the mixing chamber becomes reduced and introducing carbonic acid under pressure into the pressure chamber whereby the pressure of the carbonic acid in the pressure chamber causes the liquid to enter the mixing chamber to be saturated with the carbonic acid therein and pass from the mixing chamber into the storing vessel to displace the carbonic acid from the storing vessel into the mixing chamber, then conducting part of the carbonic acid in the pressure chamber to the storage tank to place the liquid therein under pressure, and finally reducing the pressure in the pressure chamber to atmospheric pressure.

2. The herein-described process of carbonating and bottling liquids, which consists in filling a pressure chamber with liquid from a storage tank and filling a mixing chamber with carbonic-acid under pressure, conducting part of the compressed carbonic acid from the mixing chamber into a storing vessel whereby the pressure in the mixing chamber becomes reduced and introducing carbonic acid under pressure into the pressure chamber whereby the pressure of the carbonic acid in the pressure chamber causes the liquid to enter the mixing chamber to be saturated with the carbonic acid therein and pass from the mixing chamber into the storing vessel to displace the carbonic acid from the storing vessel into the mixing chamber, then reducing the pressure in the storage tank and in the storing vessel to atmospheric pressure, then conducting part of the carbonic acid in the pressure chamber into another storing vessel to fill said vessel with carbonic acid, then conducting part of the carbonic acid in the pressure chamber to the storage tank to place the liquid therein under pressure, and finally reducing the pressure in the pressure chamber and in the storing vessel to atmospheric pressure.

The foregoing specification signed at Berne, this fifth day of November, 1904.

JEAN BIENZ.

In presence of—
FRIEDRICH NAEGELI,
NATHANAËL LEUBA.